United States Patent [19]
Willems

[11] Patent Number: 5,918,890
[45] Date of Patent: Jul. 6, 1999

[54] TRANSPORTABLE FISH HOUSE

[76] Inventor: Chris G. Willems, 2649 Belmont Lane East, North St. Paul, Minn. 55109

[21] Appl. No.: 08/872,849

[22] Filed: Jun. 11, 1997

[51] Int. Cl.$^6$ ..................................................... B60D 1/14
[52] U.S. Cl. ............................................... 280/24; 280/18
[58] Field of Search ..................................... 280/809, 810, 280/845, 15, 18, 19, 19.1, 24

[56] References Cited

U.S. PATENT DOCUMENTS

| | | | |
|---|---|---|---|
| 870,493 | 11/1907 | Collins | 280/18 |
| 2,464,884 | 3/1949 | Noyes | 296/104 |
| 2,473,076 | 6/1949 | Scheibner | 296/1 |
| 2,546,588 | 3/1951 | Ellis | 280/20 |
| 3,741,578 | 6/1973 | Dumont | 280/24 |
| 3,826,270 | 7/1974 | Hentges | 135/1 R |
| 4,239,247 | 12/1980 | Hinz | 280/24 |
| 4,524,984 | 6/1985 | Axelson | 280/18 |
| 4,870,984 | 10/1989 | Roth | 135/109 |
| 5,306,026 | 4/1994 | Jesse | 280/18 |

OTHER PUBLICATIONS

Advertisment for "The Clam—Ice Fishing Systems". Advertisement appeared in *In–Fisherman* magazine. (No Date).

*Primary Examiner*—Robert J. Oberleitner
*Assistant Examiner*—Clovia Hamilton
*Attorney, Agent, or Firm*—Jacobson & Johnson

[57] ABSTRACT

A fishing system for quickly setting up including a cargo container for hauling fishing equipment with the cargo container supported by independently mounted skis with a set of support members operable for carrying in an upright condition with at least some of the support members pivotal to a lateral support condition for supporting an forming an enclosure for a fisherperson to ice fish therefrom.

15 Claims, 8 Drawing Sheets

TRANSPORTABLE FISH HOUSE

FIELD OF THE INVENTION

This invention relates generally to fishing systems and more particularly to an ice fishing system that can be towed to a fishing location and set up in a matter of seconds.

BACKGROUND OF THE INVENTION

The concept of ice fishing is old in the art. Typically, a person augers a hole in the ice and places a line in the hole. To protect the person from the wind and cold temperatures the fisherpersons generally use small houses made of wood, metal, or canvass. One of the difficulties with fish houses is that they usually have to be removed from the ice when not in use in order to prevent vandalism of the fish house or the equipment in the fish house. In addition one may want to fish in different locations. Therefore, ideally one should have a fish house that can be transported to a remote location and can be quickly set up. The present invention provides a fish house that can be towed behind a snowmobile to allow the person to bring all the fishing equipment and the fish house to a remote location where the fish house can be set up for fishing in a matter of seconds.

SUMMARY OF THE INVENTION

Briefly, the present invention comprises a fishing system including a cargo container for hauling fishing equipment with the cargo container supported by independently mounted skis with a set of support members operable for carrying in an upright condition with at least some of the support members pivotally mounted to a lateral support condition for supporting an enclosure to form a fish house for a fisherperson to ice fish therefrom.

DESCRIPTION OF THE PREFERRED EMBODIMENT

Figure 1:
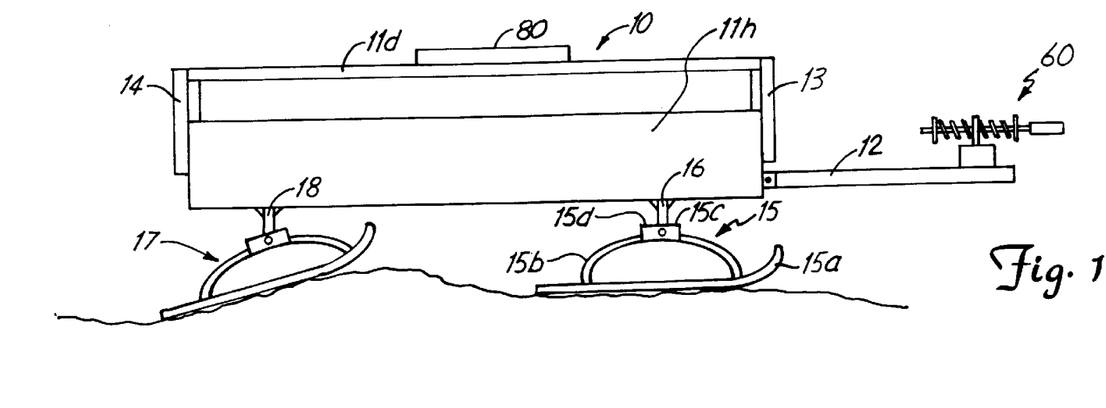
FIG. 1 shows a side view of a sled for carrying fishing equipment over uneven terrain.
Figure 2:
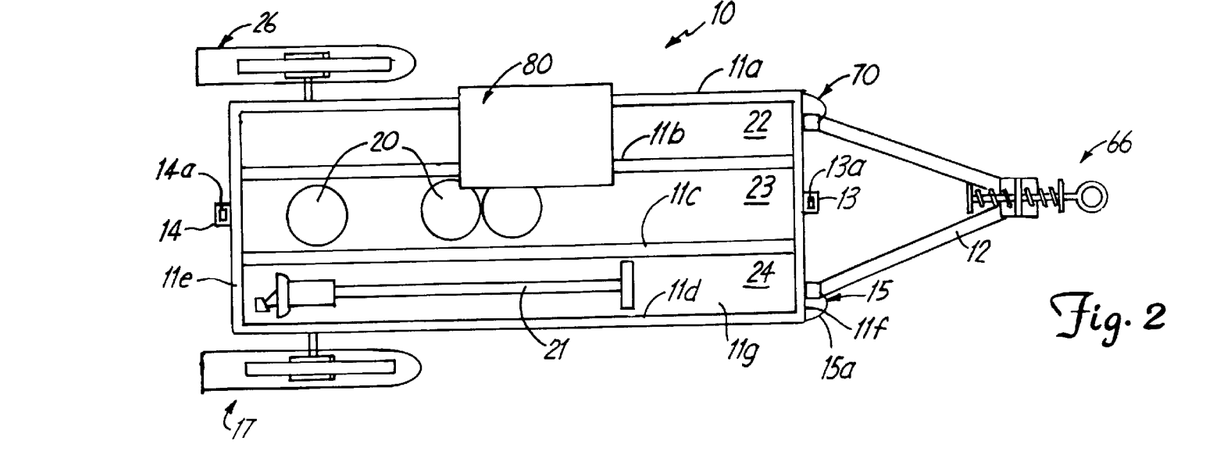
FIG. 2 shows a top view of the sled of FIG. 1.

FIG. 1 shows a side view of a sled 10 for carrying fishing equipment over uneven terrain found on both ice and land. FIG. 2 shows a top view of the sled of FIG. 1. Sled 10 includes a box or cargo container 11 having a first side (not shown) and a second side 11h, a bottom 11g, a front 11f and rails 11a, 11b, 11c and 11d that extend longitudinally along the top of cargo container 11 and over storage compartment 23. Rail 11a and rail 11d provide convenient handles to grasp and lift the cargo container, that is, a person can place his or her hand around rail 11a and 11d as sides 11h extends only partway up. Typically, storage compartment 23 is used for storing ice fishing equipment 20 including items such as a gas powered ice auger 21. The compartment is shown as being an elongated compartment to enable the storage of longer items. Located on the front of cargo container 10 is a square first housing 13 having a square opening 13a therein. Similarly, located on the rear of cargo container 11 is a square second housing 14 having a square opening 14a therein. A tongue 12 pivotally mounts to sled 10 to enable one to pull sled 10 over ice and snow. Located on tongue 12 is a shock absorbing hitch 60 which is shown in greater detail in FIG. 10 and FIG. 11. A postionable seat 80 is shown positioned on top of rails 11a and 11b.

Located on the bottom of cargo container 11 is a set of four independently pivotable skis. FIG. 1 shows a rear ski 17 and a front ski 15. A second rear ski 26 and a second front ski 70 are located on the opposite side of cargo container 11. As each of the skis are identical only one of the skis will be described. Ski 15 includes a runner 15a with a spring brace 15b extending upward from the top side of runner 15a. Located on top of spring bracket 15b is a U-shaped housing U-shaped bracket 15c having a pivot pin 15d extending through U-shaped housing 15c and cargo bracket 16 which mounts to the underside of cargo container 11. Each of the independently mounted skis pivot about a pivot axis that extends through the pivot pin connecting the U-shaped bracket to cargo bracket.

Figure 1A:
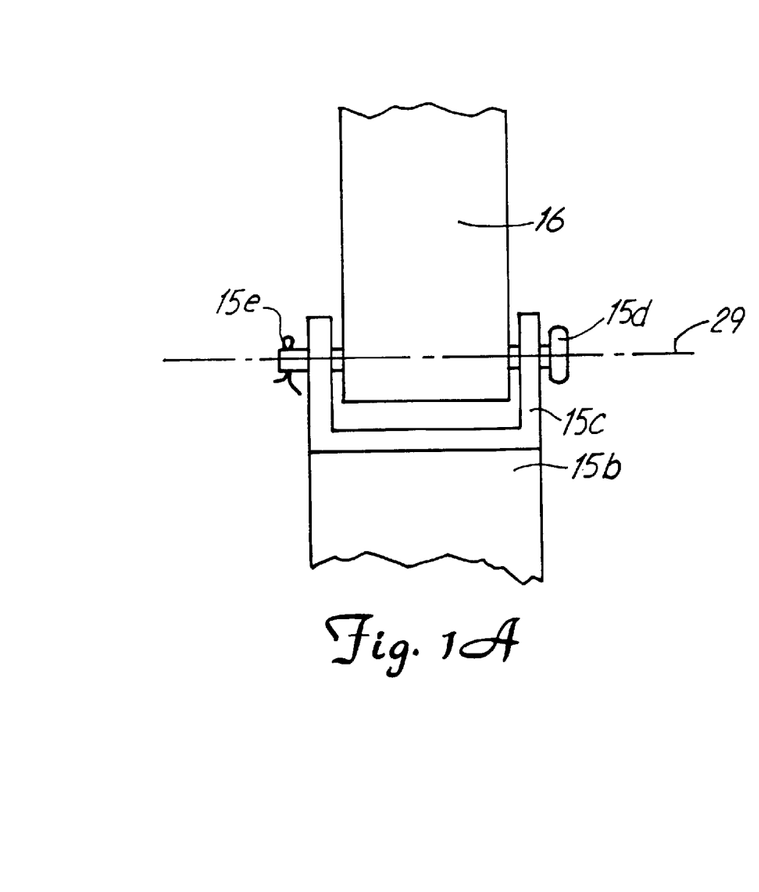
FIG. 1A shows an enlarged view of the independently pivotal mount for the skis on the sled.

FIG. 1A shows a partial rear view of the suspension connecting spring brace 15b to cargo bracket 16. Note, the pivot pin 15d extends trough openings in U-shaped bracket 15c and an opening in cargo bracket 16 so that the spring brace 15b can pivot about pivot axis 29. Consequently, the skis can pivot up and down as the skis traverse uneven snow and ice fields. With the present invention the skis are pivotable along the transverse axis of the cargo container and are positioned to maintain tracking alignment with the cargo container. That is, I have found if the skis remain in parallel condition and track forward I can provide steering of the sled through steering forces applied to tongue 12 and provide stability to the sled as the skis always remain in a condition parallel to each other and in alignment with the longitudinal direction of the cargo container 11.

Figure 1B:
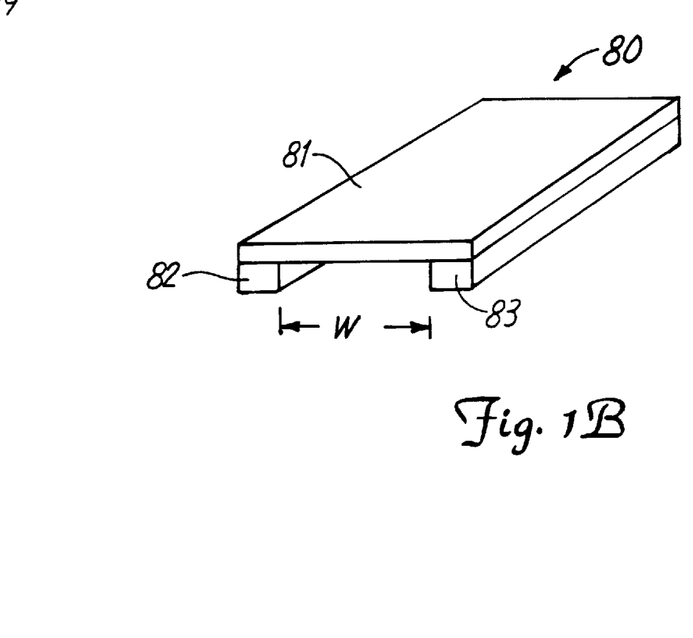
FIG. 1B shows a perspective view of the postionable seat for the sled of FIG. 1.

FIG. 1b shows a perspective view of seat 80 with seat 80 including a top platform 81 with a first stop 82 extending along one side and a second stop 83 extending along the opposite side. Stops 82 and 83 are positioned a distance apart "w" which is sufficiently large so that rails 11a and 11b can support the underside of platform 81 while the stops prevent the seat 80 from sliding off of the rails. Preferably seat 80 is made from a low heat conducting material such as wood or the like. As the stops 82 and 83 are in a parallel condition it permits the seat 80 to be positioned any where along rails 11a and 11b or rail 11c and 11d.

FIG. 1 illustrates the independent suspension of the skis, note that front ski 15 is maintaining a horizontal orientation over a level surface but the rear ski 17 is tilted at an angle to permit the ski to traverse over the uneven terrain. FIG. 2 shows the rear skis 17 and 26 are positioned outward of the cargo container to enable the tips of the skis to pivot upward without engaging the bottom of the container. In addition by having the skis 17 and 26 outward one increases the stability of the cargo container when the unit is used as a seat for ice fishing. As the tips of the front skis are forward of the container they will not engage the container as the skis transverse uneven terrain.

Figure 3:
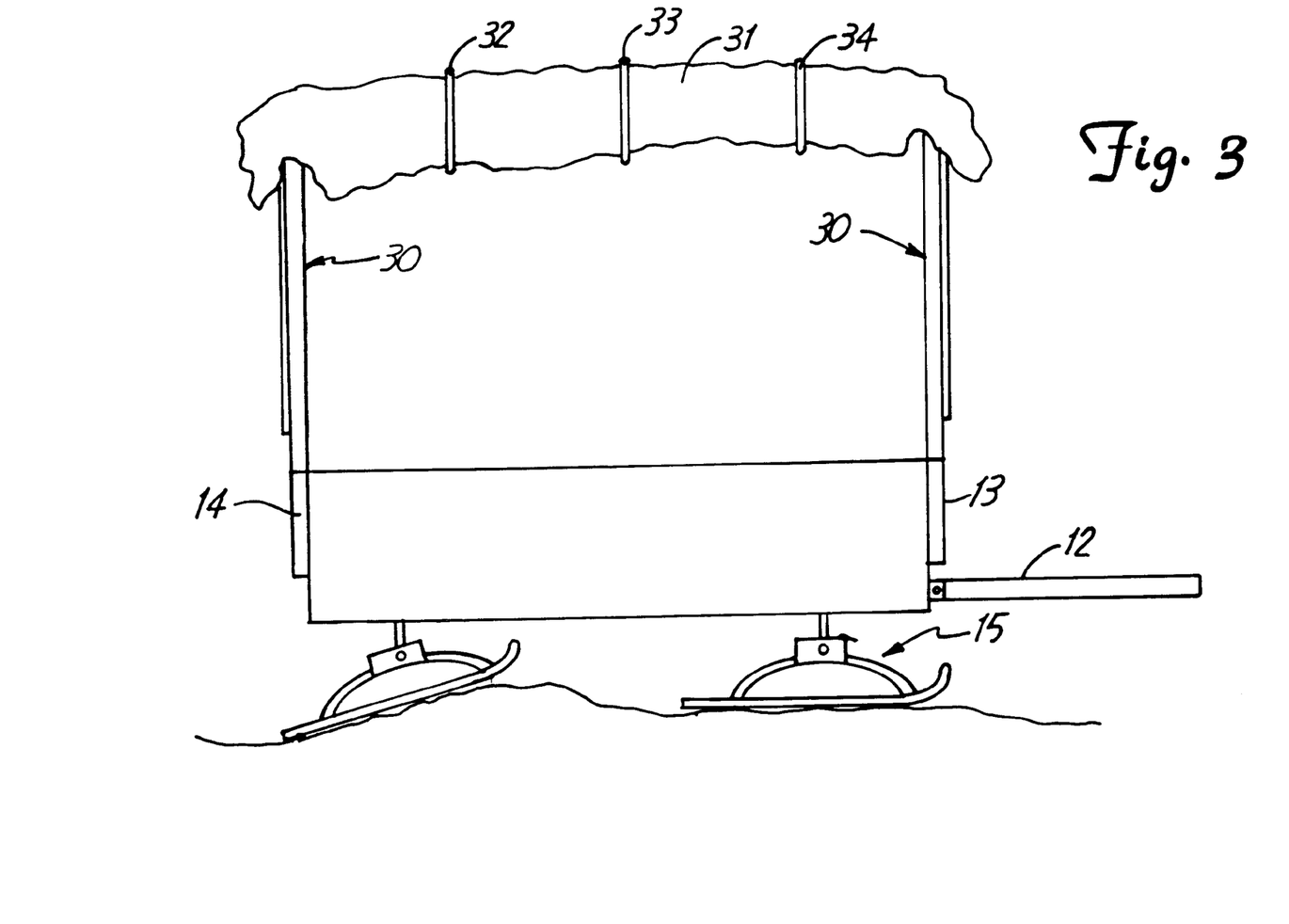
FIG. 3 shows a side view of the sled of FIG. 1 with a transportable frame and enclosure.
Figure 4:
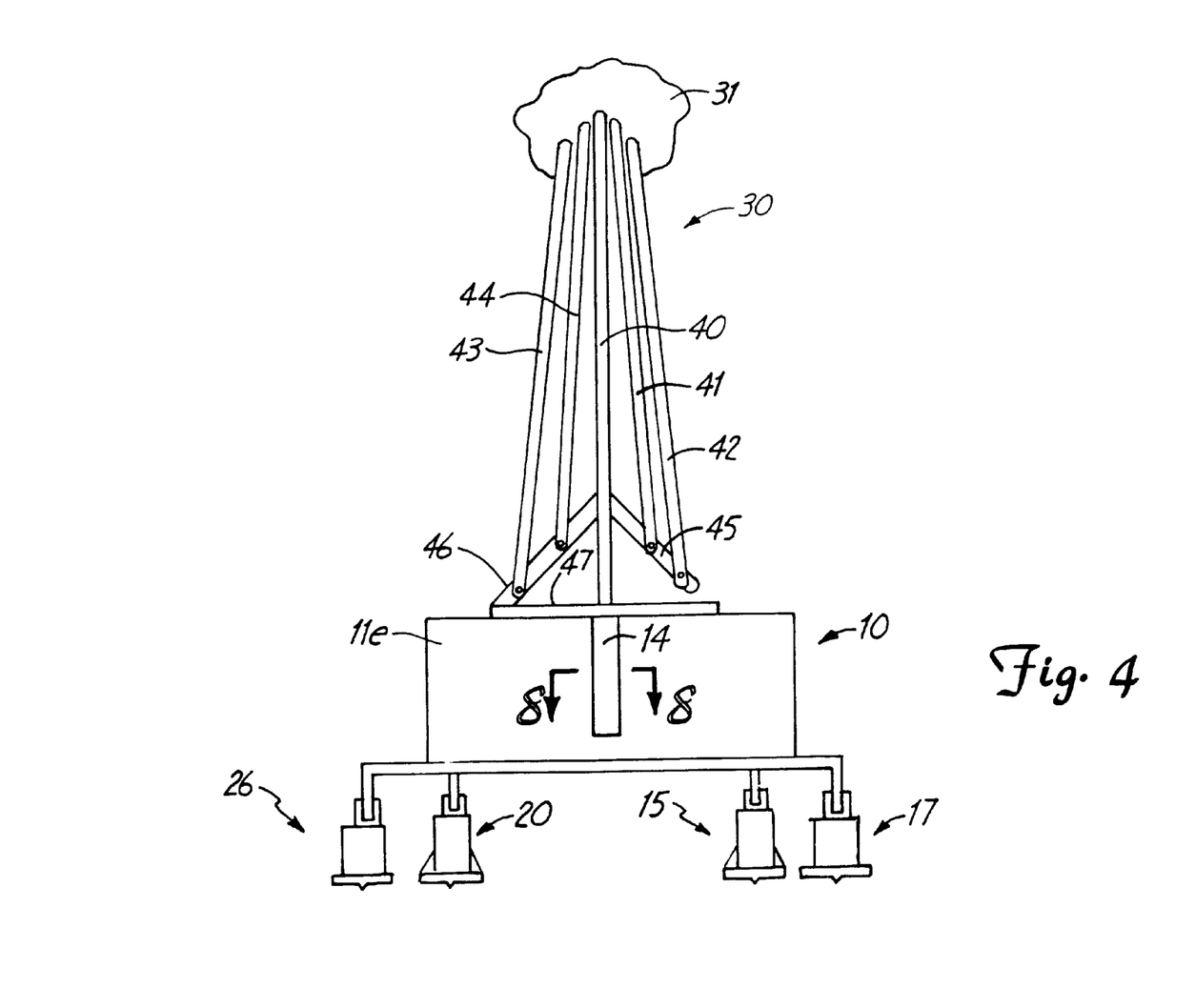
FIG. 4 shows an end view of the sled and transportable frame and enclosure of FIG. 3.

FIG. 3 shows a side view of the sled of FIG. 1 with a transportable frame and enclosure mounted thereon in a traveling condition and FIG. 4 shows and end view of the sled and transportable frame and enclosure of FIG. 3 in the traveling condition. The transportable frame 30 includes a first generally U-shaped support member 40 having a first end engaging housing 14 and a second end engaging housing 13. One end of transportable frame 30 includes a bottom triangular shaped member comprised of side members 45 and 46 and bottom member 47 while the opposite end also includes an identical triangular shaped member comprised of identical side members and an identical bottom member. A second U-shaped support member 41 has one end pivotally connected to member 45 and the other end pivotally connected to a similar member on the other end of cargo container 11. The second U-shaped support member is pivotally mounted to permit the second support member 41 to be carried in an upright position proximate first support member 40 when the cargo container is moved about. A third U-shaped support member 44 has one end pivotally connected to member 45 and the other end pivotally connected to a similar member on the other end of cargo container 11. The third U-shaped support member 44 is pivotally mounted to permit the third support member 44 to be carried in an upright position proximate first support member 40 when the cargo container is moved about. Similarly, A fourth U-shaped support member 42 has one end pivotally connected to member 45 and the other end pivotally connected to a similar member on the other end of cargo container 11. The fourth U-shaped support member 42 is pivotally mounted to permit the fourth support member 42 to be carried in an upright position proximate first support member 40 when the cargo container is moved about. A fifth U-shaped support member 43 has one end pivotally connected to member 45 and the other end pivotally connected to a similar member on the other end of cargo container 11. The fifth U-shaped support member is pivotally mounted to permit the fifth support member 43 to be carried in an upright position proximate first support member 40 when the cargo container is moved about.

FIG. 3 and FIG. 4 show an enclosure 31 extending in a wrapped condition around the top portion of support members 40, 41, 42, 43 and 44 with a set of elastic cords 32, 33, and 34 holding the enclosure 31 there around. As central support member 40 is mounted in a vertical non pivoting condition the pivotal side support members 41, 42 43 and 44 can be maintained in the condition proximate member 40 though the coaction of the enclosure 31 and the elastic cords.

Figure 5:
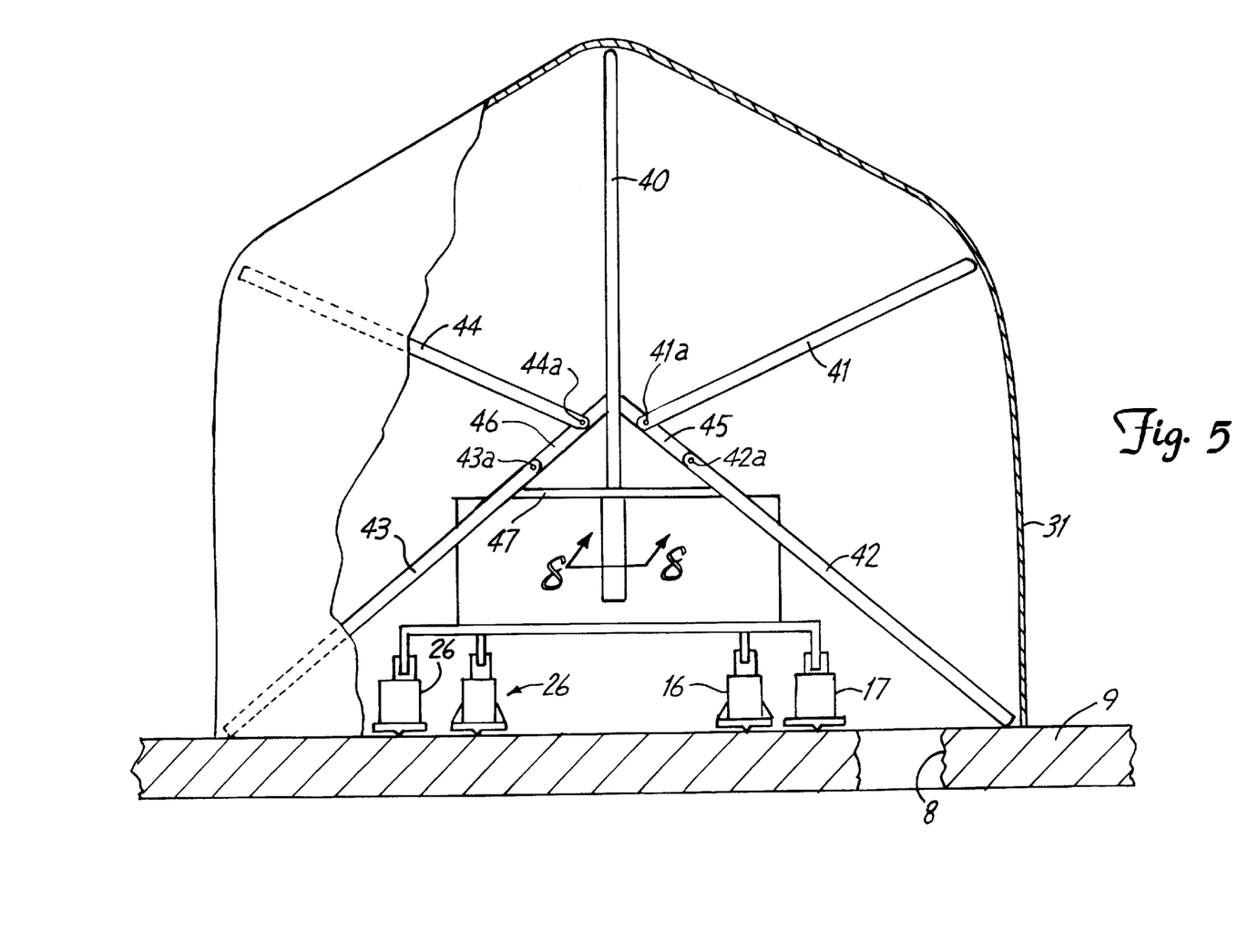
FIG. 5 shows an end view partially in section showing the sled and transportable frame and enclosure of FIG. 3 in an extended condition.

FIG. 5 shows an end view partially in section showing the sled 10 and transportable frame 30 and enclosure 31 an extended condition. Enclosure 31 comprises a flexible covering such as canvas or plastic for extending over the support members 40, 41, 42, 43, and 44. In the condition shown a first pivot pin 44a located on one end of U-shaped member 44 and a second pivot pin (not shown) located on the opposite end of support member permits U-shaped member to pivot to the lateral condition shown in FIG. 5. Similarly, a third pivot pin 41a located on one end of U-shaped member 41 and a fourth pivot pin (not shown) located on the opposite end of support member 41 permits U-shaped member to pivot to the lateral condition shown in FIG. 5.

Figure 6:
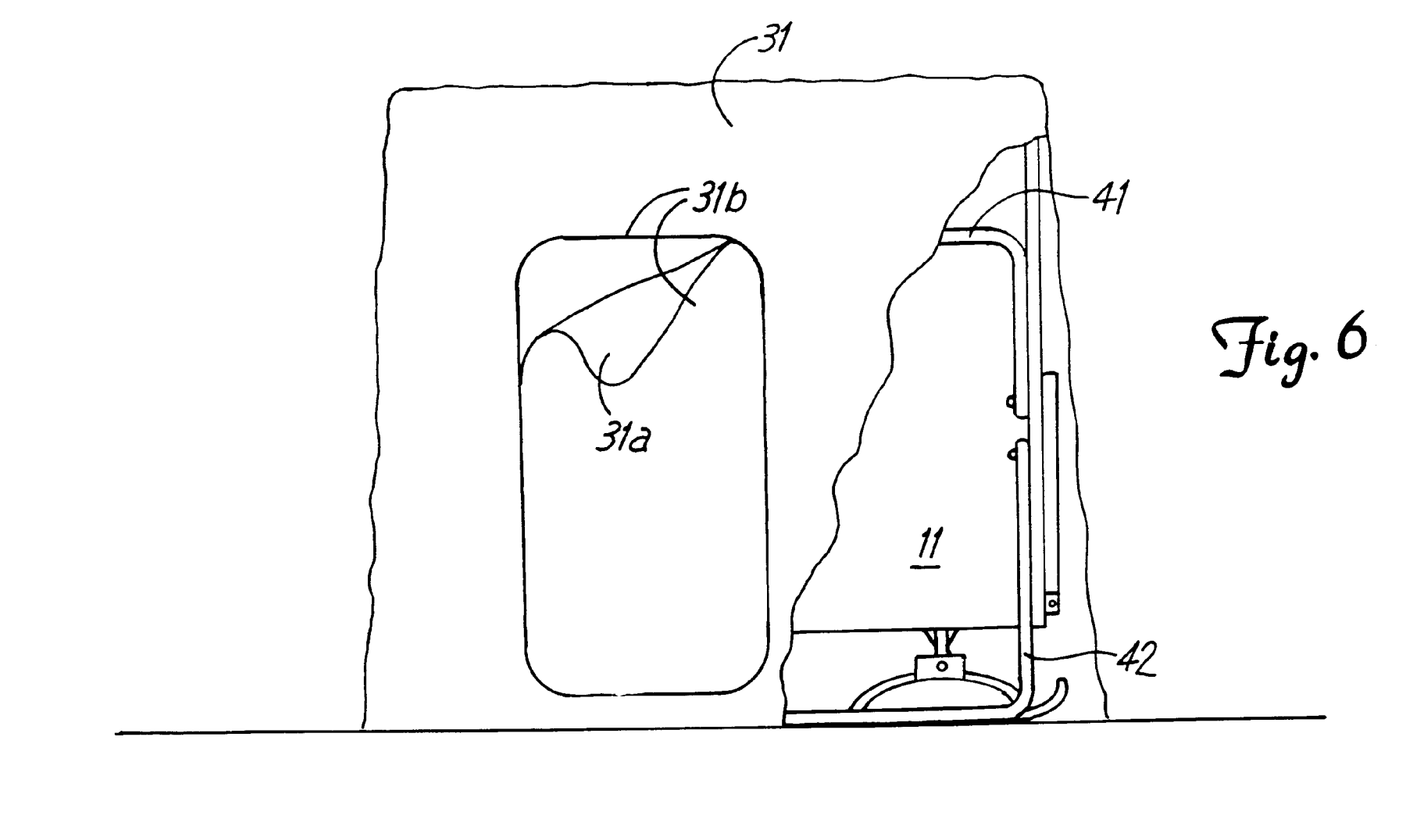
FIG. 6 shows a side view partially in section showing the sled and transportable frame and enclosure of FIG. 3 in an extended condition.

In the condition shown a fifth pivot pin 42a located on one end of U-shaped member 42 and a sixth pivot pin (not shown) located on the opposite end of support member 42 permits U-shaped member 42 to pivot to the lateral ground condition shown in FIG. 5. Similarly, a seventh pivot pin 43a located on one end of U-shaped member 43 and an eight pivot pin (not shown) located on the opposite end of support member 43 permits U-shaped member 43 to pivot to the lateral ground condition shown in FIG. 5. In this condition the support members hold the enclosure 31 in a tent like configuration to provide a region for a person to ice fish therefrom. The ice 9 for supporting the fishing sled is identified by reference numeral 9 with a hole 8 in the ice located within the enclosure formed by enclosure member 31 to provide for a person to ice fish therein. FIG. 6 shows a side view partially in section showing the sled and transportable frame and enclosure of FIG. 3 in an extended condition. Note a door 31 a extends as part of enclosure 31 with door 31a secured to enclosure by a temporary fastener such as a zipper 31b. The door 31a permits a person to enter or exit the fishing enclosure.

Figure 7:
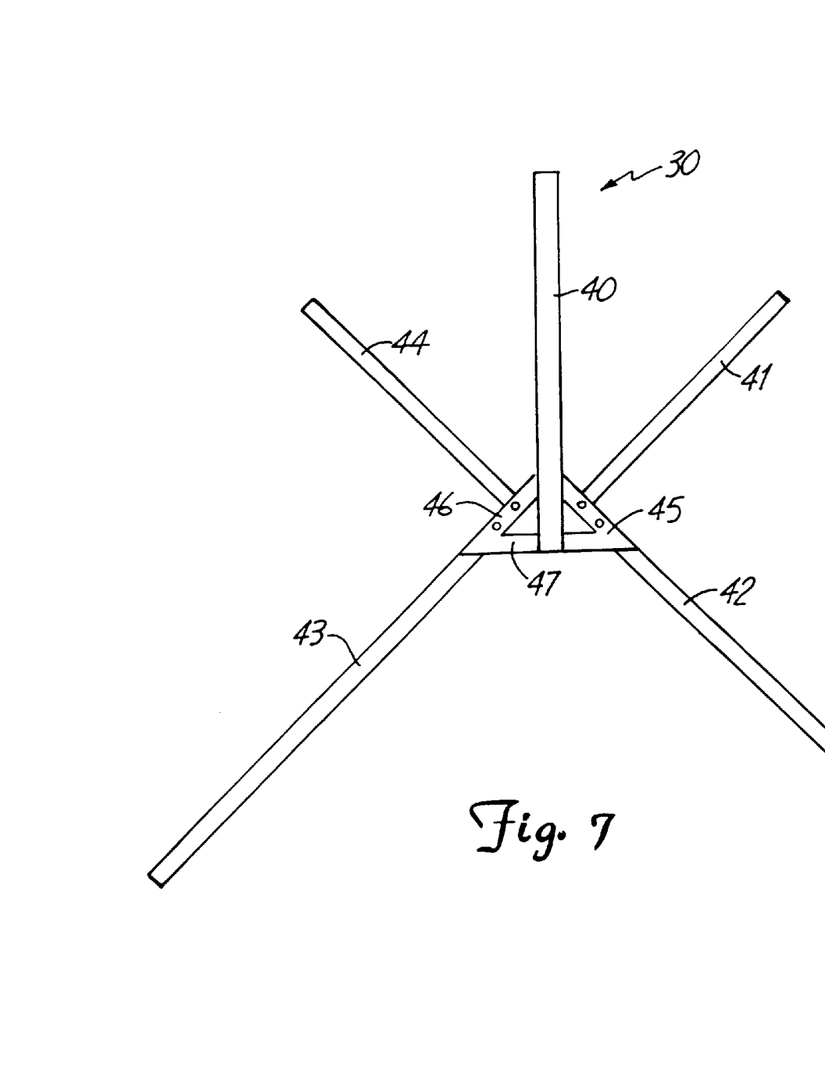
FIG. 7 shows a partial end view of the transportable frame for mounting on the sled of FIG. 1.

FIG. 7 shows a partial end view of the transportable frame for mounting on sled 10. The transportable frame 30 includes a hollow square shaped member 40 which extends downward to member 47 for engaging housing 14. Similarly, the opposite end of member 40 incudes an identical hollow square shaped member for engaging housing 13.

Figure 8:
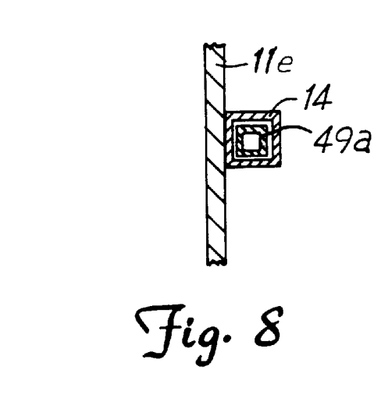
FIG. 8 shows a partial end view of a member having one end for engagement with the transportable frame and another end in engagement with a housing on the sled of FIG. 5.
Figure 8A:
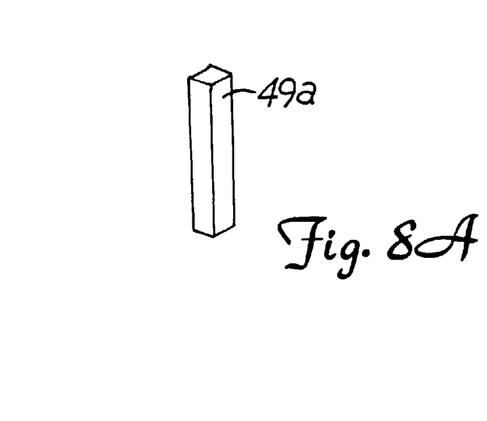
FIG. 8A shows a perspective view of a member of FIG. 8 for securing the housing on the cargo container to the transportable frame.

FIG. 8A shows a hollow square shaped member 49 that fits within the hollow square shaped member 40 and the hollow square shaped housing 14 to hold the transportable frame 30 in an upright position on cargo container 10.

FIG. 8 shows a partial end view of the transportable frame taken along lines 8—8 of FIG. 4 to show the member 49 located in mating engagement with housing 14. That is, the housing 14 acts as a stop to limit the penetration of member 49 in housing 14 so that member 49 extends partly outward of housing 14 for forming engagement with shaft 40. Thus the corresponding square shapes of housing 14 and member 49 and support member shaft 40 permit the two members 40 and 14 to be positioned in alignment with each other while member 49 is located in mating engagement with member 40 and housing 49. Although support member 40 is shown as a square shaft other shapes could be used.

Figure 9:
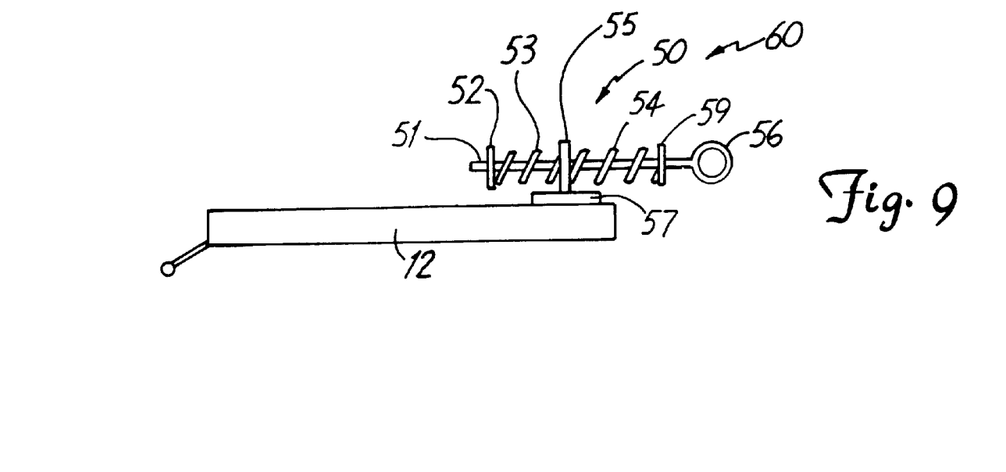
FIG. 9 shows a side view of a shock absorbing hitch.

FIG. 9 shows a side view of shock absorbing hitch 60 and tongue 12. Hitch 60 includes a cylindrical central member 51 that extends trough an opening in vertical guide plate 55 and terminates in hitch loop 56. Located on one side of guide plate 55 is a compression spring 53 which is bounded on the opposite end by a stop 52. Similarly, located on the other side of guide plate 55 is a second compression spring 54 which is bounded by a stop 59.

Figure 10:
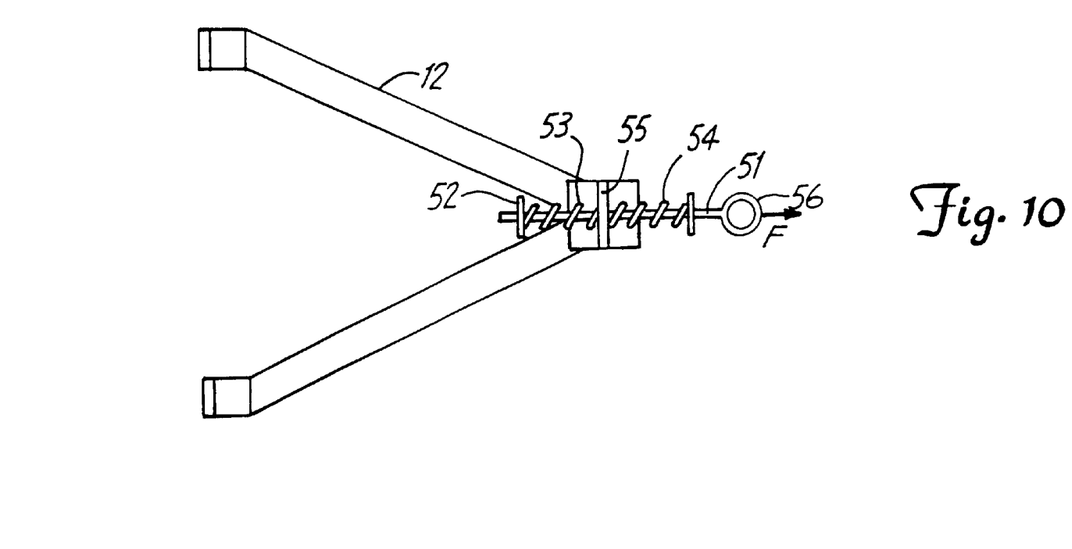
FIG. 10 shows a top view of the shock absorbing hitch of FIG. 9.

FIG. 10 illustrates how the shock absorbing hitch operates. The arrow indicates a force F on hitch loop 56. The force causes compression spring 53 to compress while spring 54 lengthens. That is the central member 51 slides within guide plate 55 as the spring compress to balance the load on hitch 60. If the towing sled should stop quickly the force F would be reversed and spring 54 would compress an spring 53 would lengthen. Thus with the present hitch one can absorb both the forces from startup up and stop and thus minimizing the tendency of the sled to push the rear of the towing vehicle from side to side.

The present invention comprises a transportable quick erecting fishing house as the fish house can be transported in the condition shown in FIG. 1 and FIG. 2. In this condition all the equipment for ice fishing is carried in the cargo container 10. When the person arrives at the ice fishing spot the elastic cords 32, 33, and 34 are removed which allows the support members 41, 44, 43, and 42 to be pivoted to the condition shown in FIG. 5 thereby automatically forming an enclosure for ice fishing. In the embodiment shown loops on the enclosures (not shown) are in engagement with the support members to act as stops to hold the support members in the position shown in FIG. 5. Thus with the present invention the enclosure can be set up in a matter of seconds by merely unlashing the elastic cords that hold the pivotal members and enclosure in position. To pack up the unit for return the operator merely pivots the U-shaped members 41, 42, 43 and 44 to a condition proximate member 40 and wraps the elastic cord around the enclosure and the U-shaped members.

I claim:

1. A transportable quick erecting fishing house comprising:
   a cargo container for storing ice fishing equipment, said cargo container having a top, a bottom, a front and a rear;
   a first housing located on said front of said cargo container and a second housing located on the rear of said cargo container;
   a set of skis attached to the bottom of said cargo container, each of said skis mounted independently to permit the cargo container to be pulled over uneven ice without tipping the cargo container or causing undue damage to articles located in the cargo container;
   a first support member, said first support member having a first end for engaging said first housing and a second end for engaging said second housing;
   a second support member, said second support member pivotable to a position proximate said first support member when the cargo container is moved about, and said second support member pivotable to a lateral position to form a first lateral support;
   a third support member, said third support member pivotable to a position proximate said first support member when the cargo container is moved about, said third support member pivotable to a lateral position to form a second lateral support;
   a flexible covering for extending over said support members with said flexible covering collapsible and securable to the said first support member to hold said flexible covering in an out of the way condition to permit trailing of said cargo container and said flexible covering to a fishing area where said flexible covering is extendible over said lateral supports to thereby form an enclosure around said cargo container to permit a person to fish through a hole in the ice while located inside the enclosure.

2. The transportable quick erecting fishing house of claim 1 including a tow hitch to pull said cargo container.

3. The transportable quick erecting fishing house of claim 2 including a shock absorber on said tow hitch to minimize shock to a towing vehicle.

4. The transportable quick erecting fishing house of claim 1 wherein said cargo container includes a plurality of rails extending across the top of said cargo container.

5. The transportable quick erecting fishing house of claim 4 including a seat for positioning over said plurality of rails to enable a person to fish therefrom.

6. The transportable quick erecting fishing house of claim 1 wherein the flexible covering is canvas.

7. The transportable quick erecting fishing house of claim 1 wherein the flexible covering includes a door to provide ingress and egress to the enclosure.

8. The transportable quick erecting fishing house of claim 1 including at least two lateral support members on each side of said first support member with each of said lateral support members pivotable from a carrying position proximate said first support member to a lateral support position to hold said enclosure in a tent-like formation.

9. The transportable quick erecting fishing house of claim 8 including a cord for securing the flexible covering and said lateral support members to said first support members to hold said lateral support members in a traveling position.

10. The transportable quick erecting fishing house of claim 1 wherein the first support member is removable from said cargo container to permit use of the cargo container as a sled.

11. The transportable quick erecting fishing house of claim 10 wherein the set of skis includes at least two pairs of skis with a rear set of skis spaced a distance from the cargo container to allow the rear set of skis to pivot up and down without engaging said cargo container.

12. The transportable quick erecting fishing house of claim 11 wherein the support members are made of metal tubing.

13. The transportable quick erecting fishing house of claim 12 including a removable seat for positioning on the top of said cargo container.

14. A transportable quick erecting fishing house comprising:
   a cargo container for storing ice fishing equipment, said cargo container having a top, a bottom, a front and a rear;
   a first housing located on said front of said cargo container and a second housing located on the rear of said cargo container;
   a set of skis attached to the bottom of said cargo container, each of said skis mounted independently to permit the cargo container to be pulled over uneven ice without tipping the cargo container or causing undue damage to articles located in the cargo container, said set of skis including at least two pairs of skis with a rear set of skis spaced a distance from the cargo container to allow the rear set of skis to pivot up and down without engaging said cargo container;
   a first support member comprising a metal tubing, said first support member having a first end for engaging said first housing and a second end for engaging said second housing, first support member removable from said cargo container to permit use of the cargo container as a sled;
   wherein the first support member is located in central alignment with the cargo container to enable the cargo container to provide lateral stability to the first support member so that the cargo container can be pulled over irregular terrain without tipping the cargo container
   a second support member comprising a metal tubing, said second support member pivotable to a position proximate said first support member when the cargo container is moved about, and said second support member pivotable to a lateral position to form a first lateral support;
   a third support member comprising a metal tubing, said third support member pivotable to a position proximate said first support member when the cargo container is moved about, said third support member pivotable to a lateral position to form a second lateral support;

a flexible covering for extending over said support members with said flexible covering collapsible and securable to said first support member to hold said flexible covering in an out-of-the-way condition to permit trailing of said cargo container and said flexible covering to a fishing area where said flexible covering is extendible over said lateral supports to thereby form an enclosure around said cargo container to permit a person to fish through a hole in the ice while located inside the enclosure; and a removable seat for positioning on the top of said cargo container.

15. A transportable quick erecting fishing house comprising:

a cargo container for storing ice fishing equipment, said cargo container having a top, a bottom, a front and a rear;

a set of skis attached to the bottom of said cargo container;

a first housing located on said front of said cargo container and a second housing located on the rear of said cargo container;

a set of support members with one of said set of support members mounted to said first housing on said cargo container and the other of said set of support members mounted to said second housing with said support members maintainable in a first upright condition for transporting said cargo container to a fishing spot and said support members postionable in a second condition to form a frame;

a flexible covering for extending over the frame formed by said support members with said flexible covering collapsible and securable to hold said flexible covering in an out of the way condition to permit trailing of said cargo container and said flexible covering to a fishing area where said flexible covering is extendible over said support member to thereby form an enclosure around said cargo container to permit a person to fish through a hole in the ice while located inside the flexible covering.

* * * * *